United States Patent
Kenney et al.

(10) Patent No.: US 9,699,727 B2
(45) Date of Patent: Jul. 4, 2017

(54) METHOD, APPARATUS, AND COMPUTER READABLE MEDIUM FOR SIGNALING HIGH EFFICIENCY PREAMBLES

(71) Applicant: Intel IP Corporation, Santa Clara, CA (US)

(72) Inventors: Thomas J. Kenney, Portland, OR (US); Robert J. Stacey, Portland, OR (US); Eldad Perahia, Portland, OR (US); Shahrnaz Azizi, Cupertino, CA (US)

(73) Assignee: Intel IP Corporation, Santa Clara, CA (US)

( * ) Notice: Subject to any disclaimer, the term of this patent is extended or adjusted under 35 U.S.C. 154(b) by 101 days.

(21) Appl. No.: 14/573,683

(22) Filed: Dec. 17, 2014

(65) Prior Publication Data

US 2016/0127992 A1 May 5, 2016

Related U.S. Application Data

(60) Provisional application No. 62/074,988, filed on Nov. 4, 2014.

(51) Int. Cl.
| | |
|---|---|
| H04L 29/06 | (2006.01) |
| H04W 52/02 | (2009.01) |
| H04W 84/12 | (2009.01) |

(52) U.S. Cl.
CPC ......... *H04W 52/0212* (2013.01); *H04L 69/18* (2013.01); *H04W 52/0216* (2013.01); *H04W 84/12* (2013.01)

(58) Field of Classification Search
None
See application file for complete search history.

(56) References Cited

U.S. PATENT DOCUMENTS

2011/0206156 A1* 8/2011 Lee ................... H04L 27/18
375/279
2012/0269124 A1 10/2012 Porat
(Continued)

FOREIGN PATENT DOCUMENTS

TW 201622386 A 6/2016
WO WO-2014130702 A1 8/2014
(Continued)

OTHER PUBLICATIONS

"International Application Serial No. PCT/US2015/053806, International Preliminary Report on Patentability mailed Nov. 9, 2016", 7 pgs.

(Continued)

*Primary Examiner* — Chi H Pham
*Assistant Examiner* — Soon-Dong D Hyun
(74) *Attorney, Agent, or Firm* — Schwegman Lundberg & Woessner, P.A.

(57) ABSTRACT

Methods, apparatuses, and computer readable media are disclosed to signal a packet configuration. A HEW device to signal a packet configuration may include circuitry. The circuitry may be configured to generate a HE packet comprising a legacy signal field (L-SIG) followed by one or more HE signal fields and include in the L-SIG the packet configuration of the HE packet to signal to a second HEW device. The circuitry may configure a length field of the L-SIG to be a one or two modulo of three (MOD 3) to indicate the HE packet. The length field of the L-SIG may indicate that the HE packet includes a portion that has a one-quarter size subcarrier. The circuitry may set the length field of the L-SIG to be 1 mod 3 to indicate a first type of HE packet and to be 2 mod 3 to indicate a second type of HE packet.

20 Claims, 7 Drawing Sheets

(56) References Cited

U.S. PATENT DOCUMENTS

| | | | |
|---|---|---|---|
| 2013/0107990 A1* | 5/2013 | Zhang | H04L 27/2613 375/329 |
| 2013/0201835 A1 | 8/2013 | Banerjea et al. | |
| 2014/0307650 A1* | 10/2014 | Vermani | H04L 5/0044 370/329 |
| 2015/0117428 A1* | 4/2015 | Lee | H04L 27/206 370/338 |
| 2015/0139119 A1* | 5/2015 | Azizi | H04W 72/1278 370/329 |
| 2015/0312941 A1* | 10/2015 | Oh | H04W 74/0816 370/338 |
| 2015/0327121 A1* | 11/2015 | Li | H04L 5/0055 370/328 |

FOREIGN PATENT DOCUMENTS

| | | |
|---|---|---|
| WO | WO-2014171788 A1 | 10/2014 |
| WO | WO-2014172198 A1 | 10/2014 |
| WO | WO-2016073091 A1 | 5/2016 |

OTHER PUBLICATIONS

"International Application Serial No. PCT/US2015/053806, International Search Report mailed Jan. 21, 2016", 3 pgs.
"International Application Serial No. PCT/US2015/053806, Written Opinion mailed Jan. 21, 2016", 10 pgs.
"Taiwanese Application Serial No. 104132421, Office Action mailed Dec. 29, 2016".

* cited by examiner

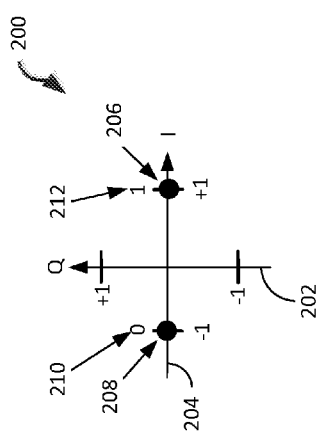
FIG. 2
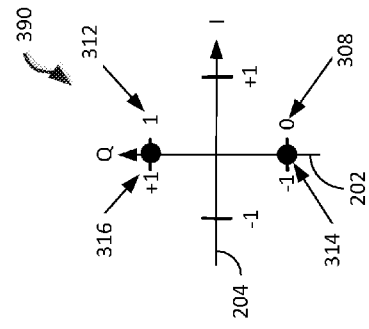
FIG. 3
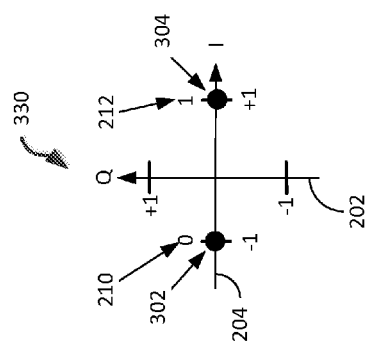

METHOD, APPARATUS, AND COMPUTER READABLE MEDIUM FOR SIGNALING HIGH EFFICIENCY PREAMBLES

PRIORITY CLAIM

This application claims the benefit of priority under 35 USC 119(e) to U.S. Provisional Patent Application Ser. No. 62/074,988, filed Nov. 4, 2014, which is incorporated herein by reference in its entirety.

TECHNICAL FIELD

Embodiments pertain to wireless networks. Some embodiments relate to transmitting and receiving preambles in wireless local area networks (WLANs) including networks operating in accordance with the Institute of Electronic and Electrical Engineers (IEEE) 802.11 family of standards. Some embodiments related to transmitting and receiving preambles in WLANs operating with both legacy standards and with a high-efficiency (HE) WLAN (HEW) or IEEE 802.11ax standard.

BACKGROUND

One issue with communicating data over a wireless network is transmitting and receiving packets that may include preamble fields. Another issue with communicating data over a wireless network is that often more than one standard may be in use in a WLAN. For example, IEEE 802.11ax, referred to as HEW may need to be used with legacy versions of IEEE 802.11.

Thus there are general needs for systems and methods that allow for transmitting and receiving preamble fields for both HEW devices and legacy devices.

BRIEF DESCRIPTION OF THE DRAWINGS

The present disclosure is illustrated by way of example and not limitation in the figures of the accompanying drawings, in which like references indicate similar elements and in which:

FIG. 2 illustrates a signal constellation that may be used in a signal field to indicate that packets that follow may be for 802.11a, in accordance with some embodiments;

FIG. 3 illustrates a series of signal constellations that may be used in a signal field to indicate that packets that follow may be for 802.11n, in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
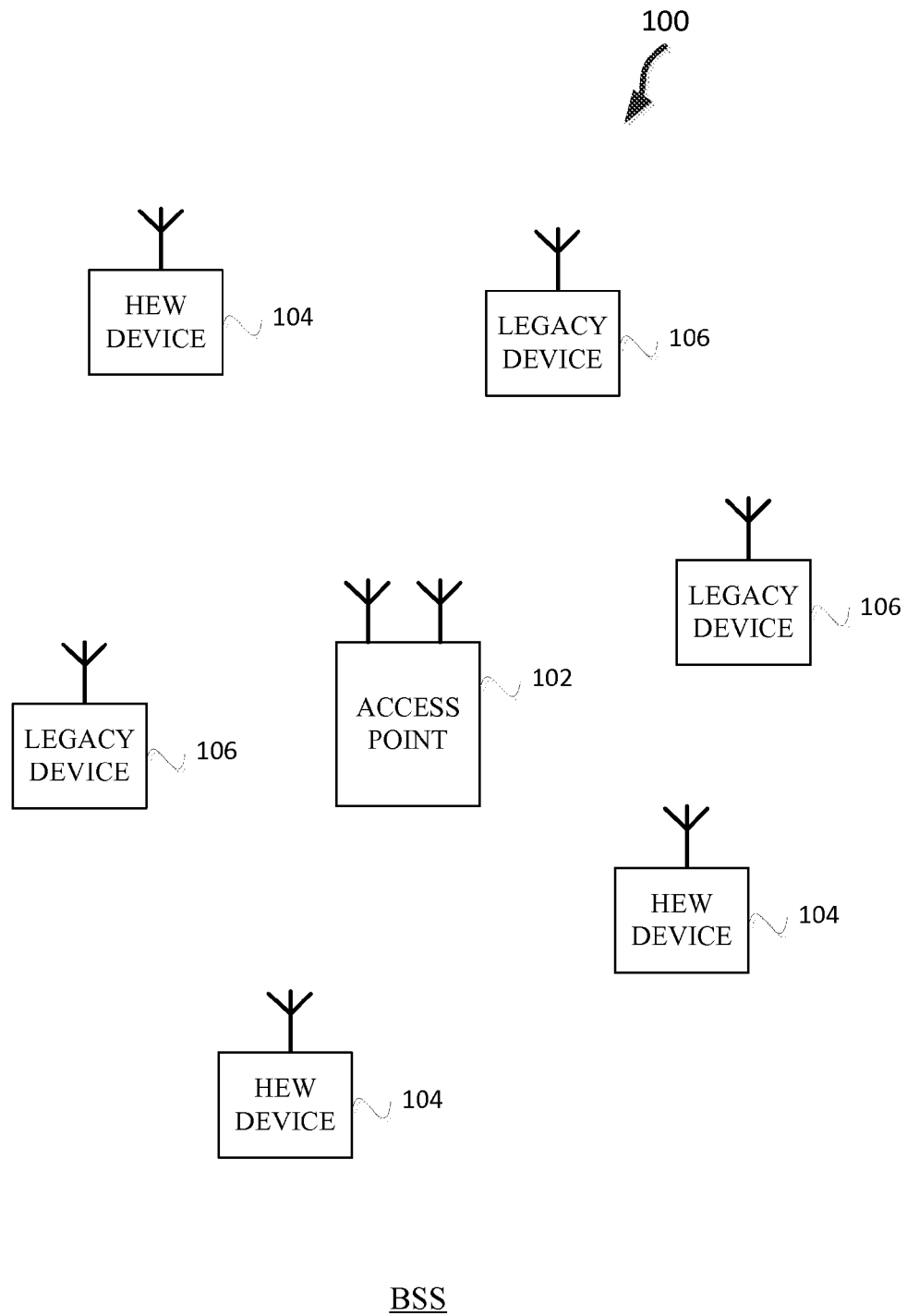
FIG. 1 illustrates a wireless network, in accordance with some embodiments.

FIG. 1 illustrates a wireless network, in accordance with some embodiments. The wireless network may comprise a basic service set (BSS) 100 that may include an access point (AP) 102, a plurality of HEW devices 104 and a plurality of legacy devices 106.

The AP 102 may be an AP using the IEEE 802.11 to transmit and receive. The AP 102 may be a base station. The AP 102 may use other communications protocols as well as the 802.11 protocol. For example, the AP 102 may use 802.16. The 802.11 protocol may be 802.11ax. The 802.11 protocol may include using Orthogonal Frequency-Division Multiple Access (OFDMA), time division multiple access (TDMA), and/or code division multiple access (CDMA). The 802.11 may include using multi-user (MU) multiple-input and multiple-output (MIMO) (MU-MIMO). The HEW devices 104 may operate in accordance with 802.11ax or another standard of 802.11. The legacy devices 106 may operate in accordance with one or more of 802.11 a/g/ag/n/ac, or another legacy wireless communication standard.

The HEW devices 104 may be wireless transmit and receive devices such as cellular telephones, handheld wireless devices, wireless glasses, wireless watches, wireless personal devices, tablets, or other devices that may be transmitting and receiving using the 802.11 protocol such as 802.11ax or another wireless protocol.

The BSS 100 may operate on a primary channel and one or more secondary channels or sub-channels. The BSS 100 may include one or more APs 102. In accordance with embodiments, the AP 102 may communicate with one or more of the HEW devices 104 on one or more of the secondary channels or sub-channels or the primary channel. In example embodiments, the AP 102 communicates with the legacy devices 106 on the primary channel. In example embodiments, the AP 102 may be configured to communicate concurrently with one or more of the HEW devices 104 on one or more of the secondary channels and a legacy device 106 utilizing only the primary channel and not utilizing any of the secondary channels.

The AP 102 may communicate with legacy devices 106 in accordance with legacy IEEE 802.11 communication techniques. In example embodiments, the AP 102 may also be configured to communicate with HEW devices 104 in accordance with legacy IEEE 802.11 communication techniques. Legacy IEEE 802.11 communication techniques may refer to any IEEE 802.11 communication technique prior to IEEE 802.11ax.

In some embodiments, HEW frames may have a bandwidth of 20 MHz, 40 MHz, an 80 MHz contiguous bandwidths, or an 80+80 MHz (160 MHz) non-contiguous bandwidth. In some embodiments, a 320 MHz contiguous bandwidth may be used. In some embodiments, bandwidths of 1 MHz, 1.25 MHz, 2.5 MHz, 5 MHz and 10 MHz or a combination thereof may also be used. In these embodiments, an HEW frame may be configured for transmitting a number of spatial streams.

In other embodiments, the AP 102, HEW device 104, and/or legacy device 106 may implement different technologies such as CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Long Term Evolution (LTE), Enhanced Data rates for GSM Evolution (EDGE), GSM EDGE (GERAN), BlueTooth®, IEEE 802.16 (i.e., Worldwide Interoperability for Microwave Access (Wi-MAX)).

In an OFDMA system such as 802.11ax, an associated HEW device 104 may operate on a sub-channel of the BSS 100 (that can operate, for example, at 80 MHz) where the sub-channel may be a portion of the 80 MHz (e.g., 1.25 MHz, 2.5 MHz, etc.).

In example embodiments, an AP 102, HEW devices 104, and legacy devices 106 use carrier sense multiple access/collision avoidance (CSMA/CA). In some embodiments, the media access control (MAC) layer 706 (see FIG. 7) controls access to the wireless media.

In example embodiments, an AP 102, HEW devices 104, and legacy devices 106, perform carrier sensing and can detect whether or not the channel is free. For example, an AP 102, HEW device 104, or legacy device 106 may use clear channel assessment (CCA), which may include a determination whether or not the channel is clear based on a Decibel-milliwatts (dBm) level of reception. In example embodiments, the physical layer (PHY) 904 is configured to determine a CCA for an AP 102, HEW devices 104, and legacy devices 106.

After determining that the channel is free, an AP 102, HEW device 104, and legacy devices 106 defer their attempt to access the channel a back-off time to avoid collisions. In example embodiments, an AP 102, HEW device 104, and legacy devices 106 determine the back-off time by first waiting a specific amount of time and then adding a random back-off time, which, in some embodiments, is chosen uniformly between 0 and a current contention window (CS) size.

In example embodiments, an AP 102, HEW devices 104, and legacy devices 106 access the channel in different ways. For example, in accordance with some IEEE 802.11ax (HEW) embodiments, an AP 102 may operate as a master station, which may be arranged to contend for a wireless medium (e.g., during a contention period) to receive exclusive control of the medium for an HEW control period (i.e., a transmission opportunity (TXOP)). The AP 102 may transmit an HEW master-sync transmission at the beginning of the HEW control period. During the HEW control period, HEW devices 104 may communicate with the AP 102 in accordance with a non-contention based multiple access technique. This is unlike conventional Wi-Fi communications in which legacy devices 106 and, optionally, HEW devices 104, communicate in accordance with a contention-based communication technique, rather than a non-contention multiple access technique. During the HEW control period, the AP 102 may communicate with HEW devices 104 using one or more HEW frames. During the HEW control period, legacy devices 106 refrain from communicating. In some embodiments, the master-sync transmission may be referred to as an HEW control and schedule transmission.

In some embodiments, the multiple-access technique used during the HEW control period may be a scheduled OFDMA technique, although this is not a requirement. In some embodiments, the multiple access technique may be a TDMA, CDMA or a frequency division multiple access (FDMA) technique. In some embodiments, the multiple access technique may be a space-division multiple access (SDMA) technique or uplink MU-MIMO (UL MU-MMIO).

The AP 102 may also communicate with legacy devices 106 in accordance with legacy IEEE 802.11 communication techniques. In some embodiments, the master station may also be configurable to communicate with HEW stations outside the HEW control period in accordance with legacy IEEE 802.11 communication techniques, although this is not a requirement.

In example embodiments, the AP 102 and/or HEW device 104 is configured to perform one or more of the functions and/or methods described herein in conjunction with FIGS. 2-6 such generating an L-SIG to indicate a HE packet or detecting that an L-SIG indicates an HE packet.

FIG. 2 illustrates a signal constellation 200 that may be used in a signal field to indicate that packets that follow may be for 802.11a, in accordance with some embodiments. The horizontal axis may be an in-phase (I) 204 portion of a received signal field, and the vertical axis may be a quadrature portion (Q) 202 portion of the received signal field. The amplitude and phase shift of the received signal field encode information. The dots 206, 208 indicate received amplitude and phase combinations of symbols 0 210 and 1 212, respectively. The power can be measured along the I axis 204 and along the Q axis 202. A greater power along the I axis 204 may indicate that the signal field is for 802.11a.

HEW devices 104 may use the signal constellation 200 to determine the I 204 and Q 202 axes, although the scope of the embodiments is not limited in this respect. HEW devices 104 may use the signal constellation 200 to determine that a packet is an 802.11a packet and defer use of the wireless medium based on a length and duration in the 802.11a packet, although the scope of the embodiments is not limited in this respect. HEW devices 104 may determine to use the 802.11a standard based on receiving the signal constellation 200, although the scope of the embodiments is not limited in this respect.

FIG. 3 illustrates a series 300 of signal constellations 330, 360, 390 that may be used in a signal field to indicate that packets that follow may be for 802.11n, in accordance with some embodiments. The signal constellations 330, 360, 390 may be similar to the signal constellation in FIG. 2. In the first signal constellation 330, the dots 302, 304 are along the I axis 204. In the second signal constellation 360, the dots 306, 310 indicate received amplitude and phase combinations of symbols 0 308, and 1 312, respectively. The dots 306, 310 are along the vertical axis 202. In the third signal constellation 390, the dots 314, 316 indicate received amplitude and phase combinations of symbols 0 308, and 1 312. The dots 314, 316 are along the vertical axis 202. The power can be measured along the I axes 204 and along the Q axes 202. The first constellation 330 may be used to determine the I axis 204 and the Q axis 202. A greater power on the Q axis 202 for the second constellation 360, and a greater power on the Q axis 202 for the third constellation 390, may indicate that the signal fields may be for 802.11n. The first constellation 330 may be a signal field. The second and third constellations 360, 390 may be high-throughput (HT) signal fields.

Legacy devices 106 that operate in accordance with 802.11a may not be able to interpret the signal constellation 360 since it is rotated. The first constellation 330 may be a signal field that includes a length field and a rate. The legacy devices 106 then defer for the entire time indicated by the length and the rate. The legacy devices 106 that operate in accordance with 802.11n can then set the length and rate fields of the first constellation 330 for the entire duration of the 802.11 transmission. In this way, the legacy devices 106 that operate in accordance with 802.11n can recognize second constellation 360 as an HT signal field and the third constellation 390 as an HT signal field and can defer legacy devices 106 operating in accordance with 802.11a.

HEW devices 104 may use the signal constellations 330, 360, and/or 390 to determine that a packet is an 802.11n packet and defer use of the wireless medium based on a duration and length in the 802.11n packet, although the scope of the embodiments is not limited in this respect. HEW devices 104 may determine to use the 802.11n standard based on receiving the signal constellations 330, 360, 390, although the scope of the embodiments is not limited in this respect.

Figure 4:
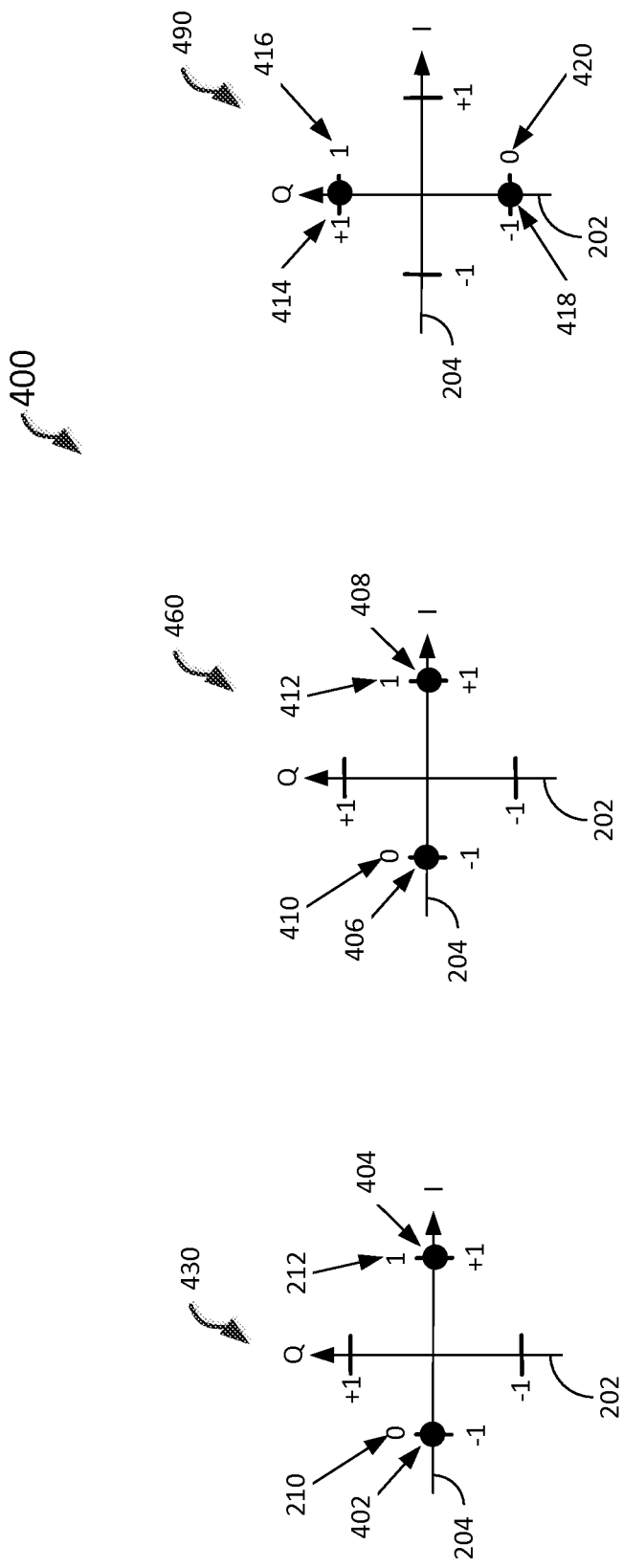
FIG. 4 illustrates a series of signal constellations that may be used in a signal field to indicate that packets that follow may be for 802.11ac, in accordance with some embodiments.

FIG. 4 illustrates a series 400 of signal constellations 430, 460, 490 that may be used in a signal field to indicate that packets that follow may be for 802.11ac, in accordance with some embodiments. The signal constellations 430, 460, 490 may be similar to the signal constellation in FIG. 2. In the first signal constellation 430, the dots 402, 404 are along the I axis 204. In the second signal constellation 460, the dots 406, 408 indicate received amplitude and phase combinations of symbols 0 410 and 1 412, respectively, and the dots 406, 408 are along the I axis 204. In the third signal constellation 490, the dots 418, 414 indicate received amplitude and phase combinations of symbols 0 420 and 1 416, respectively, and the dots 414, 416 are along the Q axis 202. The power can be measured along the I axes 204 and along the Q axes 202. The first constellation 430 may be used to determine the I axis 204 and the Q axis 202. A greater power on the I axis 202 for the second constellation 460, and a greater power on the Q axis 202 for the third constellation 490 may indicate that the signal fields may be for 802.11ac. The first constellation 430 may be a signal field. The second and third constellations 460, 490 may be very high-throughput (VHT) signal fields, which may be termed SIG-A and SIG-B.

Legacy devices 106 that operate in accordance with 802.11a may not be able to interpret the signal constellation 490 since it is rotated. The first constellation 430 may be a signal field that includes a length field and a rate. The legacy devices 106 that operate in accordance with 802.11a will defer for the entire time indicated by the length and rate in the first constellation 430. The legacy devices 106 that operate in accordance with 802.11n will recognize that the second constellation 460 is not rotated so it is not a signal field for 802.11n. The legacy devices 106 that operate in accordance with 802.11n will then defer for the entire time indicated by the length and rate in the first constellation 430.

The legacy devices 106 that operate in accordance with 802.11ac can then set the length and rate fields of the first constellation 430 for the entire duration of the 802.11ac transmission. In this way, the legacy devices 106 that operate in accordance with 802.11ac can recognize second constellation 460 as a VHT signal field and third constellation 490 as a VHT signal field, and can defer legacy devices 106 operating in accordance with 802.11a and 802.11n.

HEW devices 104 may use the signal constellations 430, 460, and/or 490 to determine that a packet is an 802.11ac packet and defer use of the wireless medium based on a duration and length in the 802.11ac packet, although the scope of the embodiments is not limited in this respect. HEW devices 104 may determine to use the 802.11ac standard based on receiving the signal constellations 430, 460, 490, although the scope of the embodiments is not limited in this respect.

Figure 5:
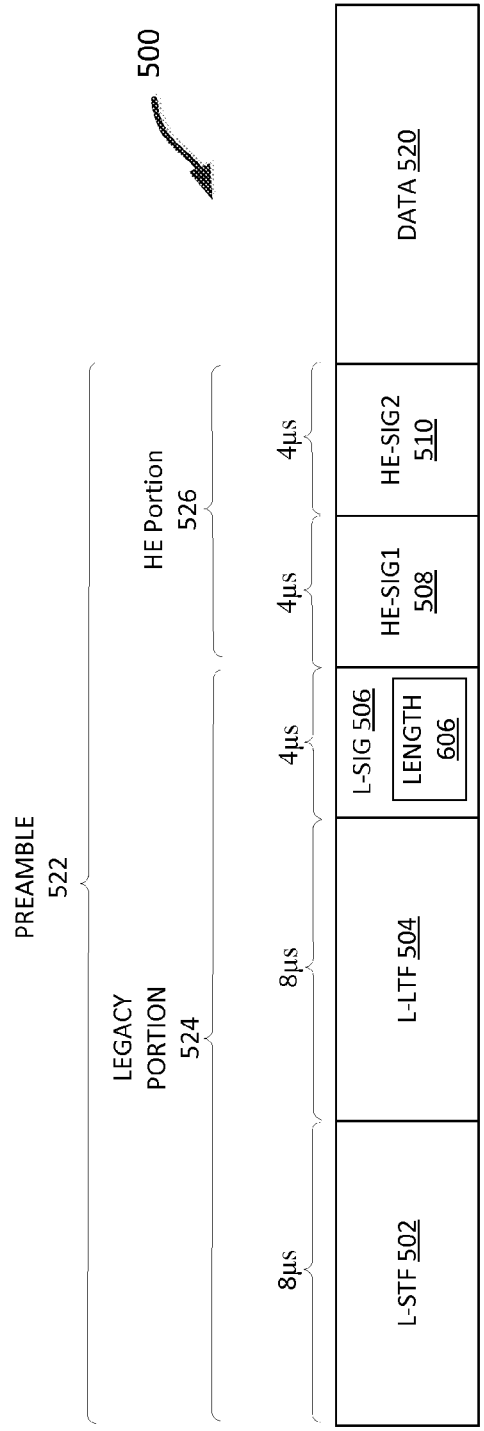
FIG. 5 illustrates a HE packet, in accordance with some embodiments.

FIG. 5 illustrates a HE packet 500, in accordance with some embodiments. The HE packet 500 may include a preamble 522 and data 520. The packet 500 may be a physical-layer convergence procedure (PLCP) protocol data unit (PPDU). The preamble 522 may include a legacy portion 524 and a HE portion 226. The legacy portion 524 may include a legacy short training field (L-STF) 502, a legacy long training field (L-LTF) 504, and a L-SIG 506, which may be modified for HE. The HE portion may include a first high-efficiency (HE) signal field (HE-SIG1) 508 and a second HE-SIG (HE-SIG2) 510. The data 520 may include data.

The L-SIG field 506 provides information about the data field as far as the coding and modulation (rate) and the length among other parameters. The L-SIG 506 may be configured to indicate to a HEW device 104 a packet configuration of the following packets, such as HE-SIG1 508, HE-SIG2 510, and/or data 520. For example, the length 606 of the L-SIG 506 may be used to indicate to a HEW device 104 a configuration of a subsequent packet. The length 606 of the L-SIG 506 may be used to indicate different types of HE-portions 526. The L-SIG 506 may also indicate to legacy devices 106 to defer.

The length 606 may be set so that the length is not a modulo of 3 (MOD 3). Legacy devices 106 that operate in accordance with 802.11ac would then determine that the HE packet 500 is not for the 802.11ac legacy device 106. The length 606 may be set so that a 1 (MOD 3) indicates a first type of HE packet 500, and a 2 (MOD 3) indicates a second type of HE packet 500. In example embodiments, the L-SIG 506 may indicate that the packet is a HE-packet 500 and the HEW device 104 may have to distinguish between different HE formats. In example embodiments, if the length MOD 3=0, then the HEW device 104 will defer for a duration indicated by the length field and a rate field.

The L-STF 502, L-LTF 504, and L-SIG 506 may be formatted so that they are compatible with legacy devices such as devices that operate in accordance with IEEE 802.11a/g/n/ac. With each evolution of the 802.11 standard (IEEE 802.11n, 802.11ac and now 802.11ax), the packet structure is designed in order to allow the corresponding devices to coexist with their previous revision legacy devices. In order to do this, each standard utilized a packet structure that included the legacy portion 524 of the preamble 522 at the beginning of the transmission. Different signal fields for each of the revisions follow the legacy portion 524 of the packet, with mechanisms to detect each of the revisions of the standard. For example, 802.11n may have a high-throughput STF (HT-STF) followed by a HT-LTF as discussed in conjunction with FIG. 3. As another example, 802.11ac may have a very-high throughput (VHT) SIG (VHT-SIG) following the legacy portion 524 as discussed in conjunction with FIG. 4.

The HE-SIG1 508 and HE-SIG2 510 may follow the L-SIG 506. The HE-SIG1 508 and HE-SIG2 510 may be in accordance with an IEEE 802.11ax standard. In example embodiments, HE-SIG1 508 and HE-SIG2 510 may be one or more symbols in length and contain information regarding the formatting of the data 520 and other information.

The HEW device 104 needs a way to recognize packet 500 as a HEW packet and a way to defer legacy devices 106. In example embodiments, HE-SIG1 508 may use a constellation pattern as second constellation 460 and HE-SIG2 510 may follow a constellation pattern as third constellation 490.

In this way, the HEW device 104 will defer legacy devices 106 that operate in accordance with 802.11a and 802.11n in the same was as described in conjunction with FIG. 4. Further, the HEW device 104 will defer legacy devices 106 that operate in accordance with 802.11ac by setting the length field 606 to not be an even modulus of 3. The legacy devices 106 that operate in accordance with 802.11ac will then defer for a period of time indicated by the length and duration fields of L-SIG 506, which may be set for the duration of the HEW device 104 transmission. In example embodiments, the HEW device 104 may defer legacy devices 106 in a different way and may recognize HEW packets in a different way.

An indication in the L-SIG 506 that subsequent fields may be the HE portion 524 (by making the length not an even modulus of 3) may enable a HEW device 104 to more quickly receive the subsequent preamble fields. An indication in the L-SIG 506 that the packet is a HE-packet 500 may be provided with very little or no overhead as the indication may be provided by the length 606 field of the L-SIG 506.

Figure 6:
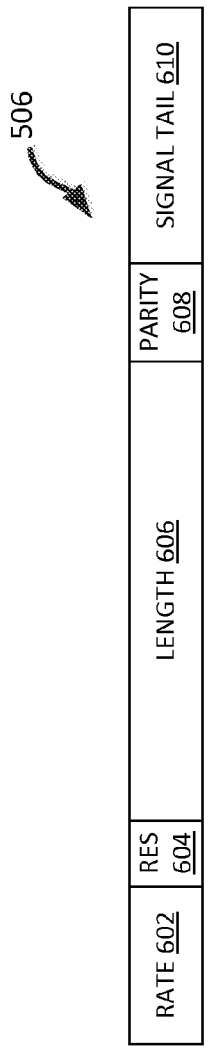
FIG. 6 illustrates a legacy signal field (L-SIG), in accordance with some embodiments.

FIG. 6 illustrates a legacy signal field (L-SIG) 506, in accordance with some embodiments. The L-SIG 506 may include a rate 602, reserved 604, length 606, parity 608, and signal tail 610. The rate 602 may be 4 bits and may be a rate that indicates a rate in millions of bits per second. The reserved 604 may be a reserved bit. The length 606 may be 12 bits and may encode a number of bytes in the embedded data 620 frame. The length 606 may be used as described in conjunction with FIG. 5 to signal to HEW devices 104 that the packet may be a HE packet 500. The parity 608 may be an even parity bit for the first 16 signal bits to provide an indication if the first 16 bits are corrupted. The tail may be six 0 bits to unwind convolutional codes.

The rate 602 of the L-SIG 506 may be set as a fixed and known value, and the length 606 of the L-SIG 506 may be set to a length that would defer legacy device 106 beyond the transmission of the HEW device 104 transmission.

Figure 7:
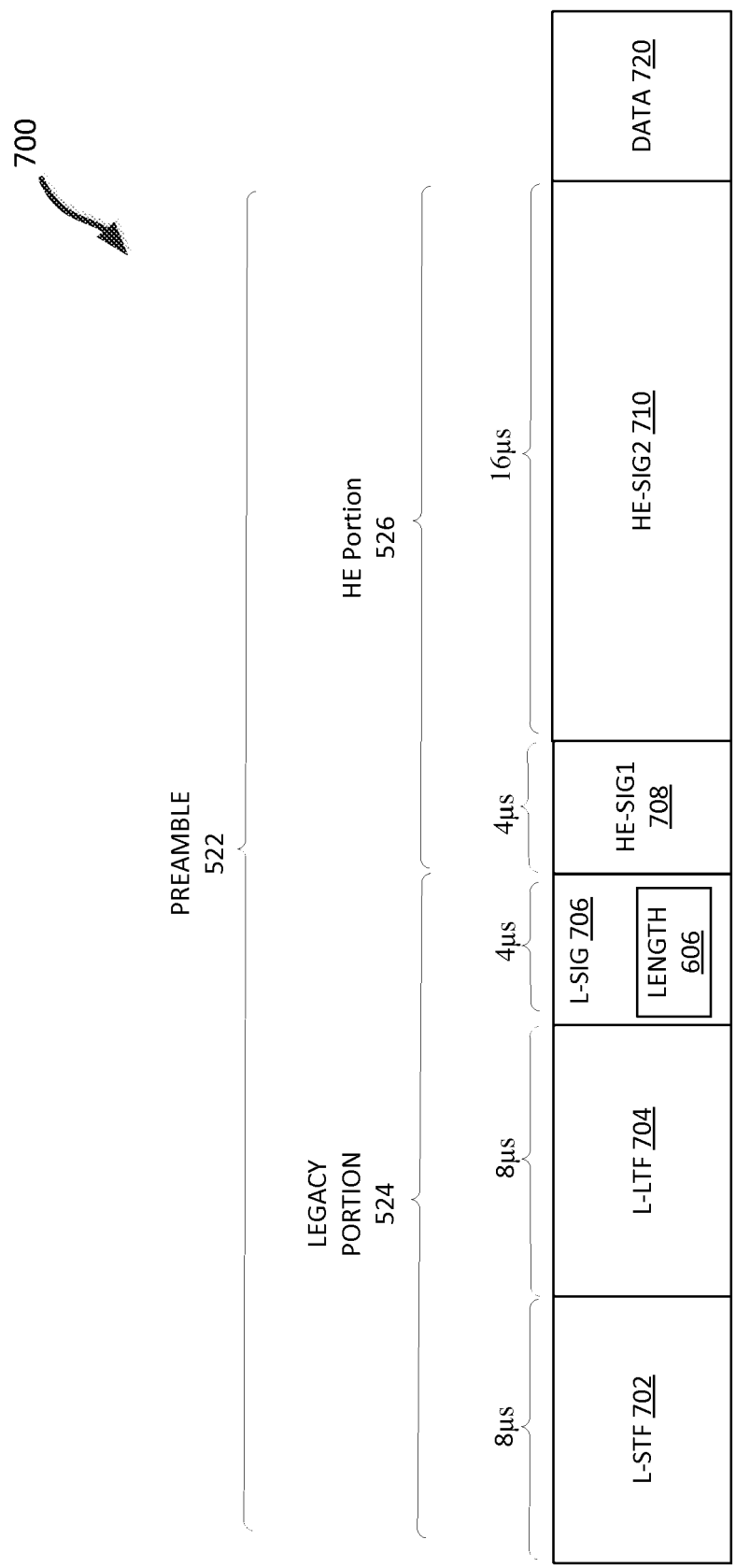
FIG. 7 illustrates a HE packet, in accordance with some embodiments.

FIG. 7 illustrates a HE packet 700, in accordance with some embodiments. Illustrated in FIG. 7 is a preamble 522, legacy portion 524, and HE portion 526. HE-SIG2 710 may be transmitted with a spacing of the subcarrier of one-quarter the spacing of the subcarrier for the legacy portion 524. L-STF 702 may be the same or similar to L-STF 502. L-LTF 704 may be the same or similar to L-LTF 504. L-SIG 706 may be the same or similar to L-SIG 506. Data 720 may be data. The length 606 may indicate to a HEW device 104 that one-quarter spacing for the subcarrier is used. Moreover, the length of one or more fields of the HE portion 526 may have a duration that is four times the duration of a duration of the legacy portion 524.

For example, in some embodiments, the standard-duration OFDM symbols may have a symbol duration that ranges from 3.6 micro-seconds (μs) including a 400 nano-second (ns) short guard interval to 4 μs as including an 800 ns guard interval. In some embodiments, the longer-duration OFDM symbols have a symbol duration that is 4× the duration of the standard-duration OFDM symbols.

In example embodiments, the HEW device 104 may recognize that the packet 700 is a HEW packet 104 based on the length 606 and one or more of HE-SIG1 708 and HE-SIG2 710. Legacy device 106 may be deferred based on the length 606 (e.g., 802.11ac devices), HE-SIG1 708, and/or HE-SIG2 710.

Figure 8:
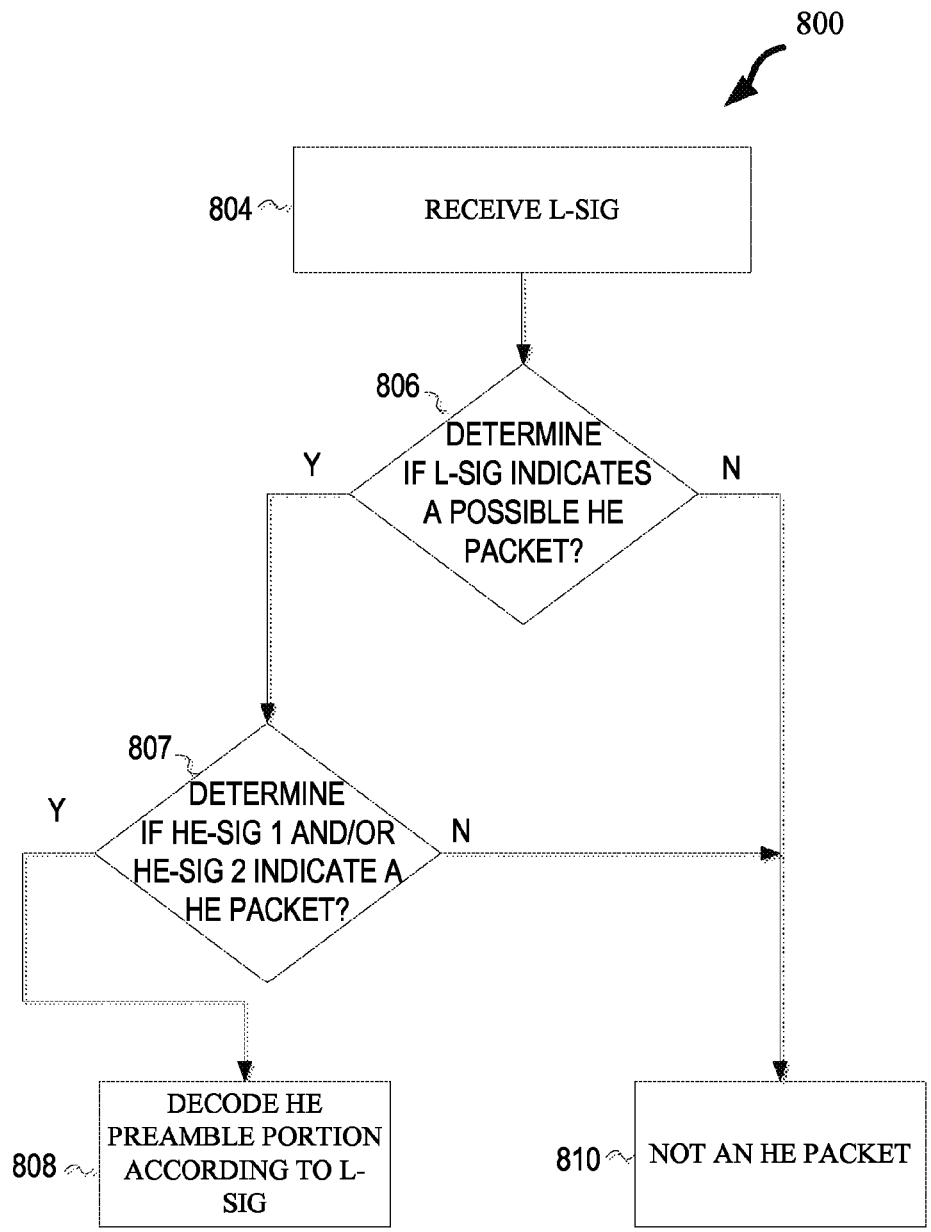
FIG. 8 illustrates a method for receiving HE packets, in accordance with some embodiments.

FIG. 8 illustrates a method 800 for receiving HE packets, in accordance with some embodiments. The method 800 may begin at operation 804 with receiving an L-SIG. For example, a HEW device 104 may receive L-SIG 506 or L-SIG 706. The HEW device 104 may receive L-STF 502 and L-LTF 504 prior to receiving the L-SIG 506. The method 800 may continue at operation 806 with determining if L-SIG indicates a possible HE-Packet. If the L-SIG does not indicate a HE-packet, then the method 800 may continue at operation 810. For example, a HEW device 104 may determine that a L-SIG 506 or L-SIG 706 does not indicate a HE packet 500, 700 because the length 606 field of the L-SIG 506, 706 may be zero modulus 3 (MOD 3), which may indicate the L-SIG 506, 706 is for 802.11ac. The HEW device 104 may defer for a period of time indicated by the rate 602 and length 606 of the L-SIG 506, 706, if the L-SIG 506, 706 does not indicate a possible HE-packet.

If the L-SIG does indicate a possible HE-packet, then the method 800 may continue at operation 807 with determining if the HE-SIG 1 and/or HE-SIG 2 indicate a HE packet. For example, HE-packets may use the first constellation 430 and the second constellation 460 as described in conjunction with FIG. 4 to defer legacy devices 106 and to detect the HEW packets 104.

If the HE-SIG 1 and/or HE-SIG 2 do indicate a HE-packet, then the method 800 may continue at operation 808 with decoding the HE preamble portion according to the L-SIG. In example embodiments, the L-SIG, HE-SIG 1, and/or HE-SIG 2 may only indicate that the packet is a HE packet 500 and not different types of HE packets. For example, the length field 506 not being 0 modulus 3 (MOD 3) may indicate that the packet is a possible HE packet, and the HEW device 104 may have to determine between different types of HE packets in other ways.

In example embodiments, there may be only one type of HE packet. In example embodiments, the length field 606 may indicate between two types of HE packets. For example, the length field 606 being 1 modulus 3 (MOD 3) may indicate a packet type as illustrated in FIG. 5, and the length field 606 being 2 modulus 3 (MOD 2) may indicate a packet type as illustrated in FIG. 7. In example embodiments, an AP 102 or master station may be configured to configure the packet and L-SIG to indicate that the packet is an HE packet. The AP 102 may transmit the L-SIG that indicates the packet is an HE packet in down-load transmissions, and the AP 102 may initiate a transmission opportunity with the HE packet. In example embodiments, HEW devices 104 may indicate that the packets are HE packets in different ways during an upload period during a transmission opportunity.

Figure 9:
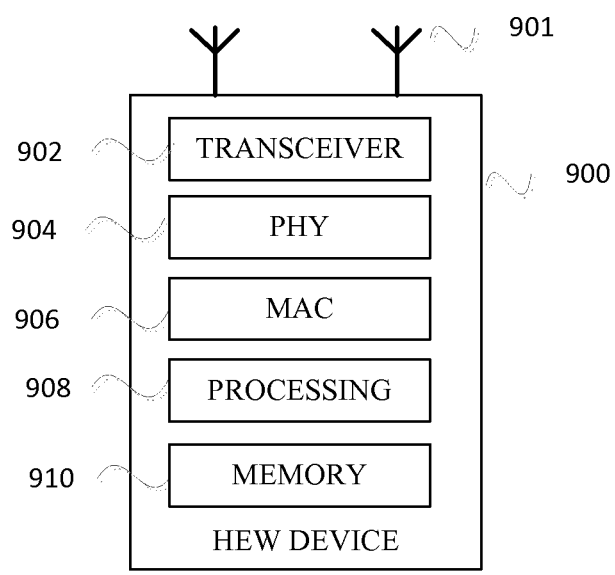
FIG. 9 illustrates a HEW device, in accordance with some embodiments.

FIG. 9 illustrates a HEW device, in accordance with example embodiments. HEW device 900 may be an HEW compliant device that may be arranged to communicate with one or more other HEW devices, such as HEW devices 104 (FIG. 1) or access point 102 (FIG. 1) as well as communicate with legacy devices 106 (FIG. 1). HEW devices 104 and legacy devices 106 may also be referred to as HEW stations (STAs) and legacy STAs, respectively. HEW device 900 may be suitable for operating as access point 102 (FIG. 1) or an HEW device 104 (FIG. 1).

In accordance with embodiments, HEW device 900 may include, among other things, a transmit/receive element 901 (for example, an antenna), a transceiver 902, PHY circuitry 904, and MAC 906. PHY 904 and MAC 906 may be HEW compliant layers and may also be compliant with one or more legacy IEEE 802.11 standards. MAC 906 may be arranged to configure PPDUs and arranged to transmit and receive PPDUs, among other things. HEW device 900 may also include other hardware circuitry 908 and memory 910 both of which may be configured to perform the various operations described herein. The hardware circuitry 908 may be coupled to the transceiver 902, which may be coupled to the transmit/receive element 901. While FIG. 9 depicts the hardware circuitry 908 and the transceiver 902 as separate components, the hardware circuitry 908 and the transceiver 902 may be integrated together in an electronic package or chip.

In example embodiments, the HEW device 900 is configured to perform one or more of the functions and/or methods described herein in conjunction with FIGS. 1-8 such generating an L-SIG to indicate a HE packet or detecting that an L-SIG indicates an HE packet.

The PHY 904 may be arranged to transmit the HEW PPDU. The PHY 904 may include circuitry for modulation/demodulation, upconversion/downconversion, filtering, amplification, and so forth. In some embodiments, the hardware circuitry 908 may include one or more processors. The hardware circuitry 908 may be configured to perform functions based on instructions being stored in a random access memory (RAM) or read-only memory (ROM), or based on special purpose circuitry. In some embodiments, the hardware circuitry 908 may be configured to perform one or more of the functions and/or methods described herein in conjunction with FIGS. 1-8 such generating an L-SIG to indicate a HE packet or detecting that an L-SIG indicates an HE packet.

In some embodiments, two or more antennas may be coupled to the PHY 904 and arranged for sending and receiving signals including transmission of the HEW packets. The HEW device 900 may include a transceiver 902 to transmit and receive data such as HEW PPDU and packets that include an indication that the HEW device 900 should adapt the channel contention settings according to settings included in the packet. The memory 910 may store information for configuring the other circuitry to perform operations for one or more of the functions and/or methods described herein for methods of transmitting pilot carriers, interpreting received pilot carriers, and generating and interpreting indications of which methods of transmitting pilot carriers to use.

In some embodiments, the HEW device 900 may be configured to communicate using OFDM and/or OFDMA communication signals over a multicarrier communication channel. In some embodiments, HEW device 900 may be configured to communicate in accordance with one or more specific communication standards, such as the EEE standards including IEEE 802.11-2012, 802.11n-2009, 802.11ac-2013, 802.11ax, standards and/or proposed specifications for WLANs, although the scope of the example embodiments is not limited in this respect as they may also be suitable to transmit and/or receive communications in accordance with other techniques and standards. In some embodiments, the HEW device 900 may use 4× symbol duration of 802.11n or 802.11ac.

In some embodiments, a HEW device 900 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be a liquid crystal display (LCD) screen including a touch screen.

The transmit/receive element 901 may comprise one or more directional or omnidirectional antennas, including, for example, dipole antennas, monopole antennas, patch antennas, loop antennas, microstrip antennas or other types of antennas suitable for transmission of radio frequency (RF) signals. In some MIMO embodiments, the antennas may be effectively separated to take advantage of spatial diversity and the different channel characteristics that may result.

Although the device 900 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following examples pertain to further embodiments. Example 1 is a high-efficiency (HE) wireless local area network (HEW) device comprising circuitry configured to signal a packet configuration by: generating a HE packet comprising a legacy signal field (L-SIG) followed by one or more HE signal fields; and configuring the L-SIG to signal to a second HEW device a packet configuration of the HE packet.

In Example 2, the subject matter of Example 1 can optionally include where the packet configuration of the HE packet is one from the following group: a length of a guard interval and a preamble configuration.

In Example 3, the subject matter of Examples 1 or 2 can optionally include where the circuitry is to configure a length field of the L-SIG to be a one or two modulo of three (MOD 3) to indicate a first HE packet configuration or a second HE packet configuration, respectively.

In Example 4, the subject matter of Example 3 can optionally include where the length field of the L-SIG indicates that the HE packet configuration includes a portion that has a one-quarter size subcarrier.

In Example 5, the subject matter of Example 1 can optionally include where the circuitry is to set a length field of the L-SIG to be mod (LENGTH, 3)=1 or mod (LENGTH, 3)=2, wherein the L-SIG is mod (LENGTH, 3)=1 indicates a first type of HE packet configuration that follows; and wherein the L-SIG is mod (LENGTH, 3)=2 indicates a second type of HE packet configuration that follows.

In Example 6, the subject matter of any of Examples 1-5 can optionally include where the circuitry is to configure the L-SIG to indicate to legacy devices to defer access for a duration indicated by a length field of the L-SIG and a duration field of the L-SIG.

In Example 7, the subject matter of any of Examples 1-6 can optionally include where the circuitry is to configure a length field of the L-SIG to be longer than a HE packet to indicate the HE packet.

In Example 8, the subject matter of any of Examples 1-7 can optionally include where the circuitry is configured to operate in accordance with orthogonal frequency division multiple access (OFDMA).

In Example 9, the subject matter of Example 9 can optionally include where the circuitry is configured to operate in accordance with Institute of Electronic and Electrical Engineers (IEEE) 802.11ax.

In Example 10, the subject matter of Example 8 can optionally include where the circuitry is further configured to transmit the HE packet to the second HEW device and to transmit a schedule to the second HEW device, the schedule to include a duration and frequency allocation for the second HEW device for a transmit opportunity; and wherein the circuitry is configured to generate a second HE packet without the L-SIG field in the transmit opportunity.

In Example 11, the subject matter of any of Examples 1-10 can optionally include where the HE packet further comprises a legacy short training field (L-STF) and a legacy long training field (L-LTF).

In Example 12, the subject matter of any of Examples 1-11 can optionally include where the HEW device is an access point.

In Example 13, the subject matter of any of Examples 1-12 can optionally include memory coupled to the circuitry.

In Example 14, the subject matter of Example 13 can optionally include one or more antennas coupled to the circuitry.

Example 15 is a method to signal a packet configuration performed by a high-efficiency (HE) wireless local area network (WLAN) (HEW) device. The method may include generating a HE packet comprising a legacy signal field (L-SIG) followed by one or more HE signal fields; configuring the L-SIG to signal to a HEW device a packet configuration of the HE packet; and transmitting the HE packet to the HEW device.

In Example 16, the subject matter of Example 15 can optionally include where configuring may further include configuring a length field of the L-SIG to be a one or two modulo of three (MOD 3) to indicate a first HE packet configuration and a second HE packet configuration, respectively.

In Example 17, the subject matter of Example 15 can optionally include where the length field of the L-SIG indicates that the HE packet configuration includes a portion that has a one-quarter size subcarrier.

In Example 18, the subject matter of Example 15 can optionally include where configuring may further include configuring a length field of the L-SIG to be mod (LENGTH, 3)=1 or mod (LENGTH, 3)=2, where the L-SIG being mod (LENGTH, 3)=1 indicates a first type of HE packet configuration and where the L-SIG being mod (LENGTH, 3)=2 indicates a second type of HE packet configuration.

Example 19 is a high-efficiency (HE) station including circuitry. The circuitry may be configured to receive a packet from a HE master station, the packet including at least a legacy signal field (L-SIG); and determine whether the L-SIG indicates that the packet is can be a HE packet; defer based on information in the L-SIG if the L-SIG indicates that the packet is not the HE-packet; process at least one of the following group: a first HE-SIG and a second HE-SIG to determine whether the packet is the HE-packet; and process the packet as the HE-packet if the packet is determined to be the HE-packet.

In Example 20, the subject matter of Example 20 can optionally include where the L-SIG indicates that the packet is an HE-packet if a length field of the L-SIG is not a modulo of three (MOD 3).

In Example 21, the subject matter of Examples 19 can optionally include where the packet includes at least one HE-SIG; and where the circuitry is further configured to process the at least one HE-SIGs as a one quarter carrier size signal if the L-SIG indicates that the packet is the HE-packet.

In Example 22, the subject matter of any of Examples 19-21 can optionally include where the circuitry is configured to operate in accordance with orthogonal frequency division multiple access (OFDMA) and in accordance with Institute of Electronic and Electrical Engineers (IEEE) 802.11ax.

In Example 23, the subject matter of any of Examples 19-22 can optionally include memory and one or more antennas coupled to the circuitry.

Example 24 is a non-transitory computer-readable storage medium that stores instructions for execution by one or more processors of a high-efficiency (HE) wireless local-area network (WLAN) (HEW) master station. The operations are to configure the one or more processors to cause the HEW master station to: generate a HE packet comprising a legacy signal field (L-SIG) followed by one or more HE signal fields; and configure the L-SIG to signal to a second HEW device a packet configuration of the HE packet.

In Example 25, the subject matter of Example 24 can optionally include where the operations are further configured to cause the HEW master station to configure a length field of the L-SIG to be a one or two modulo of three (MOD 3) to indicate a first HE packet configuration or a second HE packet configuration, respectively.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high efficiency (HE) wireless device comprising:
    media access control (MAC) circuitry; and
    physical circuitry coupled to the MAC circuitry, the physical circuitry configured to:
        encode a HE preamble for an HE Physical Layer Convergence Protocol (PLCP) Protocol Data Unit (PPDU), the HE preamble comprising a legacy signal field (L-SIG) comprising a length field of 12 bits, wherein a mod 3 of a value of the length field equal to 0 indicates a legacy Institute of Electrical and Electronic Engineers (IEEE) communications standard, and wherein the mod 3 of the value of the length field equal to 1 indicates an IEEE 802.11ax communications standard and a first HE preamble format, and the mod 3 of the value of the length field equal to 2 indicates the IEEE 802.11ax communications standard and a second HE preamble format; and
        configure the HE PPDU, comprising the HE preamble, for transmission by the HE wireless device.

2. The apparatus of claim 1, wherein the first HE preamble format indicates a single user format.

3. The apparatus of claim 1, wherein the value of the length field indicates a second value of a second length of the packet plus 0, 1, or 2 to indicate the HE preamble format.

4. The apparatus of claim 1, wherein the physical circuitry is further configured to:
    configure the HE PPDU, comprising the HE preamble, for transmission in accordance with one of orthogonal frequency division multiple access (OFDMA) or multi-user multiple-input multiple-output (MU-MIMO).

5. The apparatus of claim 1, wherein the physical circuitry is further configured to:
    configure the HE PPDU, including the HE preamble, for transmission in accordance with both OFDMA and MU-MIMO.

6. The apparatus of claim 1, wherein the HE wireless device is an Institute of Electrical and Electronic Engineers (IEEE) 802.11ax access point or an IEEE 802.11ax station.

7. The HEW device of claim 1, wherein the length field indicates to legacy devices to defer access for a duration indicated by the length field and a rate field of the L-SIG.

8. The apparatus of claim 1, wherein physical circuitry is further configured to:
encode the HE preamble to further comprise a HE portion comprising a HE-SIGA1 and a HE-SIG-A2, wherein the HE-SIG-A1 and a HE-SIG-A2 comprise information regarding an encoding of a data portion of the HE PPDU.

9. The apparatus of claim 1, wherein the physical circuitry is further configured to refrain from setting the value of the length field, wherein the value mod 3 equals 0.

10. The apparatus of claim 1, wherein the physical circuitry is further configured to:
encode the HE preamble to further comprise a HE portion comprising a HE-SIGA1 and a HE-SIG-A2, if a value of the length field mod 3 equals to 1.

11. The apparatus of claim 1, further comprising transceiver circuitry coupled to the physical circuitry.

12. The apparatus of claim 11, further comprising one or more antennas coupled to the transceiver circuitry.

13. A method performed by a high efficiency (HE) wireless device, the method comprising:
encoding a HE preamble for an HE physical layer convergence protocol (PLCP) protocol data unit (PPDU), the HE preamble comprising a legacy signal field (L-SIG) comprising a length field, wherein a mod 3 of a value of the length field equal to 0 indicates a legacy Institute of Electrical and Electronic Engineers (IEEE) communications standard, and wherein the mod 3 of the value of the length field equal to 1 indicates an IEEE 802.11ax communications standard, and a first HE preamble format and the mod 3 of the value of the length field equal to 2 indicates the IEEE 802.11ax communications standard and a second HE preamble format; and
configuring the HE PPDU, comprising the HE preamble, for transmission by the HE wireless device.

14. The method of claim 13, wherein the value of the length field indicates a second value of a second length of the packet plus 0, 1, or 2 to indicate the HE preamble format.

15. A non-transitory computer-readable storage medium that stores instructions for execution by one or more processors, the instructions to configure the one or more processors to cause a high-efficiency (HE) wireless device to:
encode a HE preamble for a HE Physical Layer Convergence Protocol (PLCP) Protocol Data Unit (PPDU), the HE preamble comprising a legacy signal field (L-SIG) comprising a length field of 12 bits, wherein a remainder 3 of a value of the length field equal to 0 indicates a legacy Institute of Electrical and Electronic Engineers (IEEE) communications standard, and wherein the remainder of the value of the length field divided by three not equal to 0 indicates an IEEE 802.11ax communications standard, and an HE preamble format; and
configure the HE PPDU, comprising the HE preamble, for transmission by the HE wireless device.

16. The non-transitory computer-readable storage medium of claim 15, wherein the remainder equal to 1 indicates a first HE preamble format and the remainder equal to 2 indicates a second HE preamble.

17. The non-transitory computer-readable storage medium of claim 15, wherein the first HE preamble format indicates a single user format, and wherein the value of the length field indicates a second value of a second length of the packet plus 0, 1, or 2 to indicate the HE preamble format.

18. An apparatus of a high efficiency (HE) station comprising:
memory; and
processing circuitry coupled to the memory, the processing circuitry configured to:
process a HE preamble of an HE physical layer convergence protocol (PLCP) protocol data unit (PPDU), the HE preamble comprising a legacy signal field (L-SIG) comprising a length field, wherein a remainder of a value of the length field divided by 3 equal to 1 indicates a legacy Institute of Electrical and Electronic Engineers (IEEE) 802.11ax communications standard, and a first HE preamble format and the remainder equal to 2 indicates the IEEE 802.11ax communications standard and a second HE preamble format; and
decode one or more subsequent fields following the L-SIG, wherein the one or more subsequent fields following the L-SIG are different for the first HE preamble format and the second HE preamble format.

19. The apparatus of claim 18, wherein the first HE preamble format indicates a single user format, and wherein the value of the length field indicates a second value of a second length of the packet plus 0, 1, or 2 to indicate the HE preamble format.

20. The apparatus of claim 18, further comprising transceiver circuitry coupled to the physical circuitry; and,
one or more antennas coupled to the transceiver circuitry.

* * * * *